(12) United States Patent
Nakagishi et al.

(10) Patent No.: US 6,466,743 B2
(45) Date of Patent: Oct. 15, 2002

(54) REAL IMAGE TYPE FINDER

(75) Inventors: Toshio Nakagishi; Isao Okuda, both of Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/771,579

(22) Filed: Jan. 30, 2001

(65) Prior Publication Data

US 2001/0010761 A1 Aug. 2, 2001

(30) Foreign Application Priority Data

Jan. 31, 2000 (JP) ........................... 2000-021181

(51) Int. Cl.⁷ .................... G03B 13/24; G03B 13/02

(52) U.S. Cl. .................. 396/150; 396/384; 396/385

(58) Field of Search ............................. 396/150, 151, 396/373, 384, 385, 386, 354

(56) References Cited

U.S. PATENT DOCUMENTS

| 4,119,982 A | * 10/1978 | Imura et al. ............... 396/354 |
| 5,555,468 A | * 9/1996 | Miura ........................ 396/386 |
| 5,640,631 A | 6/1997 | Saito |
| 5,701,534 A | 12/1997 | Taguchi et al. |
| 5,822,626 A | * 10/1998 | Kosako ...................... 396/296 |

* cited by examiner

Primary Examiner—David M. Gray
(74) Attorney, Agent, or Firm—Greenblum & Bernstein, P.L.C

(57) ABSTRACT

A real image type finder is provided with an imaging optical system, a focusing glass disposed at a focusing surface of the imaging optical system, an observing optical system for observing an image formed on the focusing glass, a case that accommodates the focusing glass and the observing optical system. The case is formed with an opening that allows only the focusing glass to be inserted in/withdrawn from the case therethrough. The finder is further provided with a covering means that removably covers the opening.

20 Claims, 3 Drawing Sheets

REAL IMAGE TYPE FINDER

BACKGROUND OF THE INVENTION

The present invention relates to a real image type finder for a camera.

A real image type finder has been widely employed, for example, in single lens reflex cameras. In the real image type finder, an image of an object is formed on a focusing glass by an imaging optical system, and the image is observed through an eyepiece optical system in a magnified fashion. In such a structure, if foreign particles such as dust particles are adhered to the focusing glass, the foreign particles may be made conspicuous in an image observed through the eyepiece optical system.

Therefore, the real image type finder is assembled generally with maximum caution not to permit the foreign particles adhering to the focusing glass surface. However, when foreign particles are found adhered to the focusing glass surface after the conventional finder is assembled, the finder system must be disassembled for removing the particles on the focusing glass, which results in costing much time and expense.

SUMMARY OF THE INVENTION

It is therefore an object of the invention to provide an improved finder system for a camera, in which foreign particles adhered to a focusing glass can easily be removed even after the finder system is assembled.

For the above object, according to the Invention, there is provided a real image type finder for a camera, which is provided with an imaging optical system, a focusing glass disposed at a focusing plane of the imaging optical system, an observing optical system through which the image formed on the focusing glass is observable, a case that accommodates at least the focusing glass and the observing optical system, the case having an opening through which only the focusing glass is allowed to be inserted in/withdrawn from the case, and a covering member that removably covers the opening.

Since the focusing glass can be inserted/withdrawn through the opening formed on the case, foreign particles adhered to the focusing glass can be removed easily, without disassembling the finder.

Optionally, the camera may be a single lens reflex camera having a photographing lens, and the photographing lens may constitute the imaging optical system.

In a particular case, the camera may employ a beam splitter for dividing light passed through the photographing lens into light for photographing, and light that forms the image on the focusing glass. Alternatively, the camera may be one employing a quick return mirror instead of the beam splitter.

Optionally, the covering member may include a covering element, and a sealing element located between the covering element and the focusing glass, and the sealing element may be inserted in the opening.

The sealing element may be a single member formed of elastic material. Further, the sealing element may hermetically seal the opening and hermetically contact the covering element and the focusing glass.

Still optionally, the focusing glass and the sealing element may have respective engaging portions. In this case, the sealing element and the focusing glass may be inserted in/withdrawn from the case through the opening with the respective engaging portions being engaged with each other.

According to another aspect of the invention, there is provided a real image type finder for a camera, that is provided with an imaging optical system that forms an image of an object on a focusing plane, a focusing glass disposed at the focusing plane, an observing optical system, the image formed on the focusing glass being observed through the observing optical system, a case that contains at least the focusing glass and the observing optical system, one side of the case being formed with a first opening that allows at least the beam splitter and the focusing glass to be placed in the case, another side of the case being formed with a second opening, the second opening allowing only the focusing glass to be inserted in and/or withdrawn from the case, a first covering member that covers the first opening, the first covering member being removable from the case, and a second covering member that covers the second opening, the second covering member being removable from the case.

Optionally, the camera may be a single lens reflex camera having a photographing lens, and in this case, the photographing lens may constitute the imaging optical system.

Further, the camera may employ a beam splitter for dividing light passed through the photographing lens into light for photographing, and light that forms the image on the focusing glass.

Still optionally, the second covering member may have a covering element, and a sealing element located between the covering element and the focusing glass, the sealing element being inserted in the second opening.

In this case, the sealing element that may be an elastic element hermetically seals the second opening, and hermetically contacts the covering element and the focusing glass.

Further optionally, the focusing glass and the sealing element have respective engaging portions, the sealing element and the focusing glass being inserted in/withdrawn from the case through the second opening with the respective engaging portions being engaged with each other.

BRIEF DESCRIPTION OF THE ACCOMPANYING DRAWINGS

DESCRIPTION OF THE EMBODIMENTS

Hereinafter, referring to the accompanying drawings, embodiments according to the present invention will be described.

Figure 1:
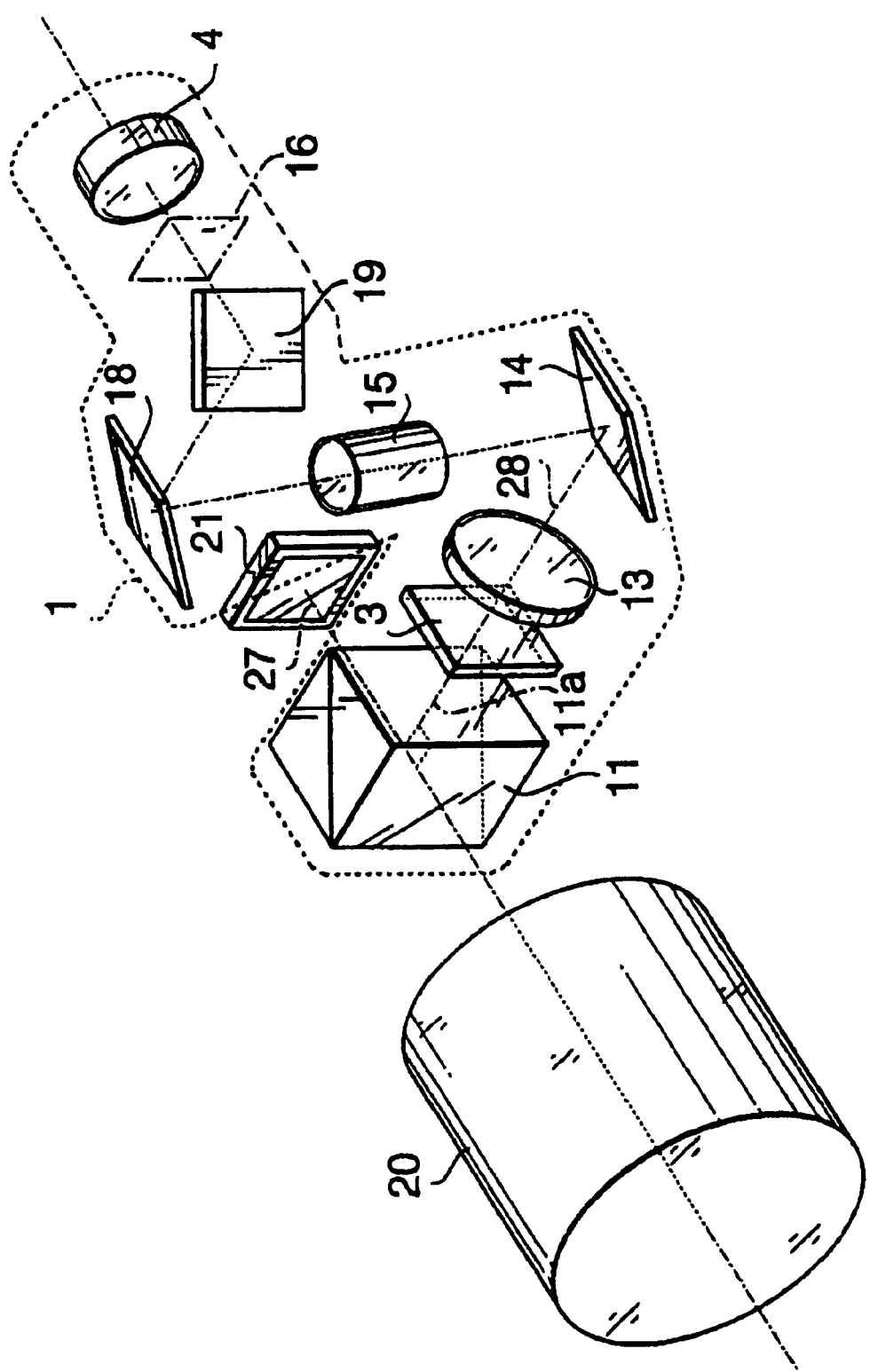
FIG. 1 shows an arrangement of optical elements of a real image type finder optical system for a camera, according to an embodiment of the invention.

FIG. 1 shows a photographing lens 20, and an arrangement of optical elements of a real image type finder 1 according to an embodiment of the present invention. Light from an object is incident on the photographing lens 20 and passes therethrough. The light proceeds along a first optical path 27 and is incident on a beam splitter 11. Part of the light incident on the beam splitter 11 is reflected by a beam splitting surface 11a and proceeds, along a second optical path 28, toward a focusing glass 3. The remaining part of the light incident on the beam splitter 11 passes through the beam splitting surface 11a, and proceeds, along the first optical path 27, to a light receiving surface of an image capturing element 21 (e.g., a CCD), to form an image thereon.

The light incident on the focusing glass 3 forms a reversed image thereon. Then, light from the focusing glass 3 is collected by a condenser lens 13, and is reflected by a first mirror 14. The light reflected by the first mirror 14 passes through a relaying optical system 15, which reverses and magnifies the image. The light passed through the relaying optical system 15 is reflected by a second mirror 18, reflected by a third reflecting mirror 19, and forms an erected image on a second focusing plane 16. The erected image is observed through an observing optical system including an eyepiece lens 4.

Figure 2:
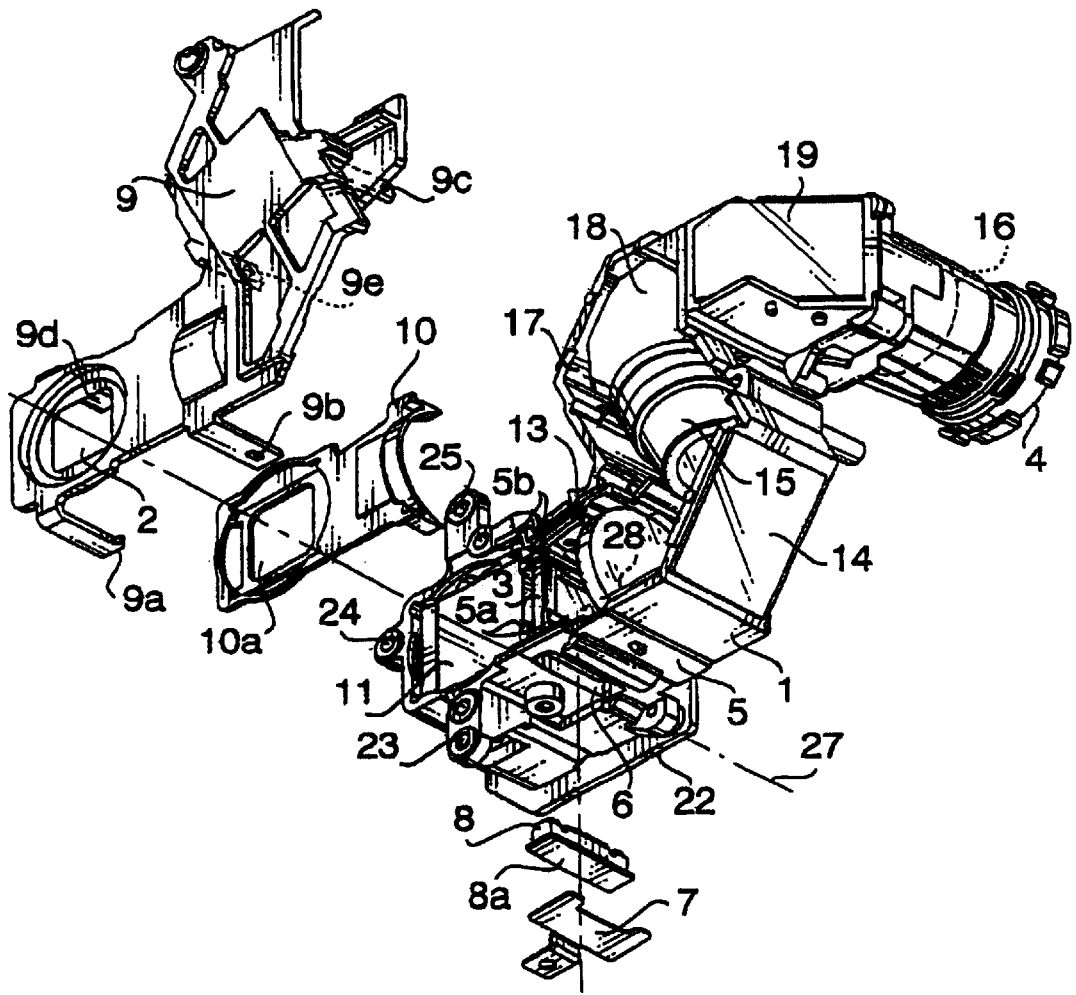
FIG. 2 shows an exploded view showing a structure of the real image type finder.

FIG. 2 shows an exploded view of the structure of the real image type finder 1. The finder 1 has a case 5, on which a first screw hole 23, a second screw hole 24 and a third screw hole 25 are formed. The finder 1 is secured onto a base plate 22, on which an image capturing element 21 is provided, by screwing at the first screw hole 23, the second screw hole 24 and the third screw hole 25. In front of the finder 1 (i.e., on the left-hand side in FIG. 2), the photographing lens 20 is arranged. Although not shown, the photographing lens 20 is integrally assembled with the finder 1 by not shown assembling structure.

A one side, which is parallel to the second optical path 28, of the case 5 is formed to be a first opening 17. The beam splitter 11, the condenser lens 13 and the relay optical system 15 are installed in the case 5 via the first opening 17.

Specifically, inside the case 5, a guide for accepting the peripheral portion of each of the optical elements (e.g., the beam splitter 11, the condenser lens 13 and the relaying optical system 15) is formed, and these optical elements are respectively supported thereby.

The finder 1 is provided with a first covering member 9 that covers the first opening 17. The first covering member 9 is formed with a first arm 9a, a second arm 9b, a third arm 9c, a fourth arm 9d and a fifth arm 9e. Each of the first arm 9a and the fourth arm 9d has a hook at an end portion, which engages with a corresponding engaging portion formed on a side surface of the case 5. Each of the second arm 9b, the third arm 9c and the fifth arm 9e has an engaging hole at an end portion, in which an engaging protrusion formed on the outer surface of the case 5 is fitted. With this structure, the first covering member 9 fits onto the case 5 and covers the first opening 17 thereof. A light inlet window 2 is formed on the first covering member 9. Through the light inlet window 9, light passed through the photographing lens 20 is introduced toward the beam splitter 11.

As shown in FIG. 2, a first dust preventing seal 10 is provided between the optical elements accommodated in the case 5 and the first cover member 9. The first dust preventing seal 10 prevents foreign particles from entering inside the case 5 through a space between the first covering element 9 and the case 5. The first dust preventing seal 10 is a single molded member made of elastic material. The first dust preventing seal 10 has an opening 10a of which size is approximately the same as that of the light inlet window 2.

The first dust preventing seal 10 covers the opening, extending from the beam splitter 11 to the condenser lens 13. The first covering member 9 is fitted to the case 5 so that the first dust preventing seal 10 is supported and pressed between the inner surface of the first covering member 9, and the side surfaces of the beam splitter 11, the focusing glass 3 and the condenser lens 13, which allows a tight fitting because of the elasticity of the seal 10. The first covering member 9 is disposed between the photographing lens 20 and the case 5, and therefore, the first covering member 9 can not be removed from the case 5 without disassembling the integrally formed photographing lens 20 and the finder 1.

If foreign particles are found to be adhered to the focusing glass after the photographing lens 20 and the finder 1 are assembled, it becomes necessary to remove the foreign particles from the focusing glass 3. However, it is relatively troublesome to remove the first covering member 9 from the case 5. Further, it is not preferable to remove the covering member 9 at this stage since all the optical elements are exposed to outside, which may introduce further dust particles inside the finder 1.

As shown in FIG. 2, a second opening 6 is formed, at a portion corresponding to the focusing glass 3, on one of the side surfaces of the case 5. The surface on which the second opening 6 is formed is substantially parallel with the second optical path 28 and is not located between the photographing lens 20 and the optical elements of the finder 1. In the embodiment, the second opening 6 is formed on a surface, which is parallel with a bottom surface of the camera body.

Figure 4:
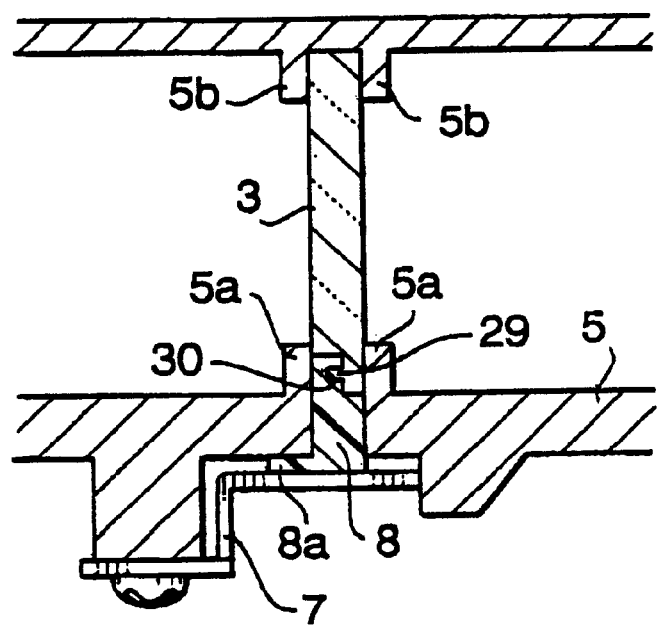
FIG. 4 shows a cross section of the vicinity of a focusing glass of the real image type finder.

The opening 6 is formed such that the focusing glass 3 can easily be Inserted and withdrawn therethrough without much play therebetween. The focusing glass 6 inserted, through the second opening 6. inside the case 5 is supported by the rails 5a and 5b that are formed inside the case 5, the rails 5a and 5b extending in the direction perpendicular to the second optical path 28 and parallel to the first optical path 27 as shown in FIG. 4.

Specifically, the second opening 6 perpendicularly penetrates the above-described surface at an area between a pair of rails 5a and 5b supporting one side of the focusing glass 6, and extends in the direction parallel to the first optical path 27. The area of the opening 6 is slightly wider than the area of the cross section along a plane parallel to the surface having the second opening 6, of the focusing glass 3 so that the focusing glass 3 can easily be inserted/withdrawn therethrough, as shown in FIG. 4.

Further, the finder 1 has a second covering member 7 that covers the second opening 6, with a second dust preventing seal 8 provided therebetween. The second dust preventing seal 8 is a single molded member made of elastic material, and is attached to the case 5 such that it is supported between an inner surface of the second covering member 7 and the side surface of the focusing glass 3. When the second covering member 7 is secured onto the case 5, as shown in FIG. 4, the second dust preventing seal 8 is press-contacted onto the side surface of the focusing glass 3.

The size of the second dust preventing seal 8 is slightly larger, in the direction of width and thickness of the focusing glass 3, than that of the second opening 6. Thus, when the second dust preventing seal 8 is inserted into the second opening 6, the second dust preventing seal 8 is slightly pressed by the inner wall defining the opening 6 so as to prevent the focusing glass 3 from dropping therethrough, and to hermetically close the second opening 6. Further, when the dust preventing seal 8 and the focusing glass 3 is fully inserted in the case 5, through the second opening 6, and the focusing glass 3 is located in position, a lower end thereof is slightly protruded from the opening 8 (see FIG. 4).

Figure 3:
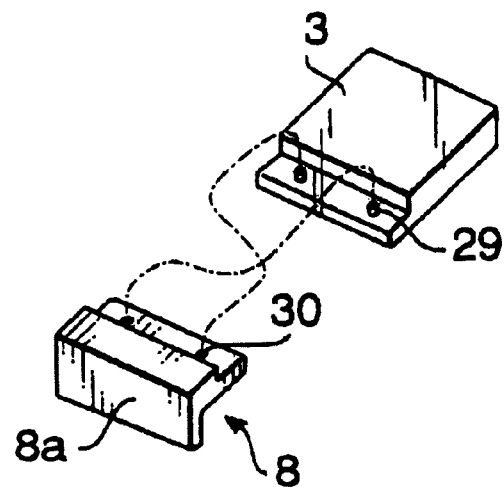
FIG. 3 shows a perspective view of an arrangement of a focusing glass and a dust protecting seal.

FIGS. 3 and 4 show the structure of the focusing glass 3 and the dust preventing seal 8. As shown in the drawings, the focusing glass 3 has bosses 29, and the second dust preventing seal 8 has holes 30, with which the bosses 29 engage. Since the bosses 29 and the holes 30 are engaged with each other so that the focusing glass 3 and the second dust preventing seal 8 are made integrated, the focusing glass 3 can be easily withdrawn from the case 5, through the second opening 6, simply by pulling the second dust preventing seal 8 outward. The bosses 29 and the holes 30 can be engaged/disengaged merely by moving the focusing glass 3 relative to the dust preventing seal 8 in the thickness direction of the focusing glass 3.

When the focusing glass 3 together with the second dust preventing seal 8 is inserted into the case through the opening 6, with the bosses 29 and the holes 30 being engaged with each other, the bosses 29 and the holes 30 are kept pressed and guided by the inner wall defining the opening 6.

When the focusing glass 3 and the second dust preventing seal 8 are to be withdrawn from the case 5, the focusing glass 3 and the second dust preventing seal 8 are kept integral till the bosses 29 and the holes 30 are completely drawn out of the opening 6.

Therefore, the focusing glass 3 can be inserted into/drawn out of the case 5 using the dust preventing seal 8 as a knob. In particular, as described above, the lower end portion of the dust preventing seal 8 is slightly protruded from the second opening 6. Thus, when the focusing glass 3 is withdrawn, the protruded portion 8a of the dust prevent seal,8 is grasped by an operator. Optionally, the protruded portion Ba may be formed larger than the other portion to allow an easy operation as shown in FIGS. 2–4.

According to the finder system described above, foreign particles, if adhered to the focusing glass 3, can be eliminated not by disassembling the finder 1 but only by removing the second cover element 7 and pulling the dust preventing seal 8 together with the focusing glass 3 for cleaning the foreign particles.

Although the described is a single lens reflex camera employing the beam splitter 11, the present invention can be applied to a finder system in a camera employing a quick return mirror as a substitute for the beam splitter.

Further, according to the invention, the position of the second opening 6 for inserting/withdrawing the focusing glass is not restricted to a position shown in the figures, but may be designed at any portion of the case at which the focusing glass can be inserted/withdrawn conveniently, depending on the structure of the camera and the finder therefor.

The present disclosure relates to the subject matter contained in Japanese Patent Applications No. 2000-021181, filed on Jan. 31, 2000, which is expressly incorporated herein by reference in its entirety.

What is claimed is:

1. A real image type finder for a camera, comprising:
an imaging optical system; a focusing glass disposed at a focusing plane of said imaging optical system;
an observing optical system through which the image formed on said focusing glass is observable;
a case that accommodates at least said focusing glass and said observing optical system, said case having an opening through which only said focusing glass can be inserted in and/or withdrawn from said case without disassembling said case; and
a covering member that removably covers said opening.

2. The real image type finder according to claim 1,
wherein said camera includes a photographing lens, said photographing lens constituting said imaging optical system.

3. The real image type finder according to claim 2,
wherein said camera comprises a beam splitter for dividing light passed through said photographing lens into light for photographing, and light that forms the image on said focusing glass.

4. The real image type finder according to claim 1,
wherein said covering member comprises a covering element, and a sealing element located between said covering element and said focusing glass, said sealing element being inserted in said opening.

5. The real image type finder according to claim 4,
wherein said sealing element comprises an elastic element hermetically sealing said opening, and hermetically contacting said covering element and said focusing glass.

6. The real image type finder according to claim 4,
wherein said focusing glass and said sealing element have respective engaging portions, said sealing element and said focusing glass being inserted in/withdrawn from said case through said opening with said respective engaging portions being engaged with each other.

7. The real image type finder according to claim 1,
wherein said covering member is configured to form an integral unit with said focusing glass to insert and withdraw said focusing glass through said opening by grasping a portion of said covering member.

8. A real image type finder for a camera, comprising:
an imaging optical system that forms an image of an object on a focusing plane;
a focusing glass disposed at said focusing plane;
an observing optical system, the image formed on said focusing glass being observed through said observing optical system;
a case that contains at least said focusing glass and said observing optical system, one side of said case being formed with a first opening, another side of said case being formed with a second opening, said second opening allowing only said focusing glass to be inserted in and/or withdrawn from said case without disassembling said case;
a first covering member that covers said first opening, said first covering member being removable from said case; and
a second covering member that covers said second opening, said second covering member being removable from said case.

9. The real image type finder according to claim 8,
wherein said camera includes a photographing lens, said photographing lens constituting said imaging optical system.

10. The real image type finder according to claim 9,
wherein said camera comprises a beam splitter for dividing light passed through said photographing lens into light for photographing, and light that forms the image on said focusing glass.

11. The real image type finder according to claim 8,
wherein said second covering member comprises a covering element, and a sealing element located between said covering element and said focusing glass, said sealing element being inserted in said second opening.

12. The real image type finder according to claim 11,
wherein said sealing element comprises an elastic element hermetically sealing said second opening and hermetically contacting said covering element and said focusing glass.

13. The real image type finder according to claim 11,
wherein said focusing glass and said sealing element have respective engaging portions, said sealing element and said focusing glass being inserted in/withdrawn from said case through said second opening with said respective engaging portions being engaged with each other.

14. The real image type finder according to claim 8, wherein said second covering member is configured to form an integral unit with said focusing glass to insert and withdraw said focusing glass through said second opening by grasping a portion of said second covering member.

15. A real image type finder for a camera, comprising:
an imaging optical system;
a focusing glass disposed at a focusing plane of said imaging optical system;
an observing optical system through which the image formed on said focusing glass is observable;
a case that accommodates at least said focusing glass and said observing optical system, said case having an opening through which only said focusing glass is allowed to be inserted in/withdrawn from said case; and
a covering member that removably covers said opening;
wherein said covering member comprises a covering element, and a sealing element located between said covering element and said focusing glass, said sealing element being inserted in said opening; and
wherein said sealing element comprises an elastic element hermetically sealing said opening, and hermetically contacting said covering element and said focusing glass.

16. The real image type finder according to claim 15, wherein said sealing element includes a portion that may be grasped to insert and withdraw said focusing glass through said opening.

17. A real image type finder for a camera, comprising:
an imaging optical system that forms an image of an object on a focusing plane;
a focusing glass disposed at said focusing plane;
an observing optical system, the image formed on said focusing glass be observed through said observing optical system;
a case that contains at least said focusing glass and said observing optical system, one side of said case being formed with a first opening, another side of sad case being formed with a second opening, said second opening allowing only said focusing glass to be inserted in and/or withdrawn from said case;
a first covering member that covers said first opening, said first covering member being removable from said case; and
a second covering member that covers said second opening, said second covering member being removable from said case;
wherein said second covering member comprises a covering element, and a sealing element located between said covering element and said focusing glass, said sealing element being inserted in said second opening; and
wherein said sealing element comprises an elastic element hermetically sealing said second opening and hermetically contacting said covering element and said focusing glass.

18. The real image type finder according to claim 17, wherein said sealing element includes a portion that may be grasped to insert and withdraw said focusing glass through said second opening.

19. A real image type finder for a camera, comprising:
an imaging optical system;
a focusing glass disposed at a focusing plane of said imaging optical system;
an observing optical system through which the image formed on said focusing glass is observable;
a case that accommodates at least said focusing glass and said observing optical system, said case having an opening through which only said focusing glass is allowed to be inserted in/withdrawn from said case; and
a covering member that removably covers said opening;
wherein said covering member comprises a covering element, and a sealing element located between said covering element and said focusing glass, said sealing element being inserted in said opening; and
wherein said focusing glass and said sealing element have respective engaging portions, said sealing element and said focusing glass being inserted in/withdrawn from said case through said opening with said respective engaging portions being engaged with each other.

20. A real image type finder for a camera, comprising:
an imaging optical system that forms an image of an object on a focusing plane;
a focusing glass disposed at said focusing plane;
an observing optical system, the image formed on said focusing glass be observed through said observing optical system;
a case that contains at least said focusing glass and said observing optical system, one side of said case being formed with a first opening, another side of sad case being formed with a second opening, said second opening allowing only said focusing glass to be inserted in and/or withdrawn from said case;
a first covering member that covers said first opening, said first covering member being removable from said case; and
a second covering member that covers said second opening, said second covering member being removable from said case;
wherein said second covering member comprises a covering element, and a sealing element located between said covering element and said focusing glass, said sealing element being inserted in said second opening; and
wherein said focusing glass and said sealing element have respective engaging portions, said sealing element and said focusing glass being inserted in/withdrawn from said case through said second opening with said respective engaging portions being engaged with each other.

* * * * *